US010931667B2

(12) United States Patent
Krishan

(10) Patent No.: US 10,931,667 B2
(45) Date of Patent: Feb. 23, 2021

(54) METHOD AND SYSTEM FOR PERFORMING USER AUTHENTICATION

(71) Applicant: Baldev Krishan, Pleasanton, CA (US)

(72) Inventor: Baldev Krishan, Pleasanton, CA (US)

( * ) Notice: Subject to any disclaimer, the term of this patent is extended or adjusted under 35 U.S.C. 154(b) by 309 days.

(21) Appl. No.: 16/118,416

(22) Filed: Aug. 30, 2018

(65) Prior Publication Data

US 2019/0222570 A1 Jul. 18, 2019

Related U.S. Application Data

(60) Provisional application No. 62/618,209, filed on Jan. 17, 2018.

(51) Int. Cl.
*H04L 29/06* (2006.01)
*G06F 21/35* (2013.01)
(Continued)

(52) U.S. Cl.
CPC .......... *H04L 63/0853* (2013.01); *G06F 21/35* (2013.01); *G06F 21/45* (2013.01); *H04L 63/083* (2013.01); *H04L 63/0861* (2013.01); *H04L 63/10* (2013.01); *H04W 12/0608* (2019.01); *H04L 63/08* (2013.01)

(58) Field of Classification Search
CPC ............. H04L 63/0853; H04L 63/0861; H04L 63/083; H04L 63/10; H04L 63/08; H04W 12/0608; G06F 21/35; G06F 21/45
See application file for complete search history.

(56) References Cited

U.S. PATENT DOCUMENTS 7,483,984 B1 1/2009 Jonker et al.
7,894,634 B2 2/2011 Chung
(Continued)

FOREIGN PATENT DOCUMENTS

WO WO 2016/145454 A1 9/2016

OTHER PUBLICATIONS

Faisca, et al., Decentralized Semantic Identity, Semantics 2016 Proceedings of the 12th International Conference on Semantic Systems, Leipzig, Germany, pp. 177-180 (2016).
(Continued)

*Primary Examiner* — J. Brant Murphy
(74) *Attorney, Agent, or Firm* — Eversheds Sutherland (US) LLP; Christopher C. Bolten; Robert D. Ward

(57) ABSTRACT

Systems and methods involving a user authentication system for granting access to digital systems and content, computing systems and devices and physical locations. The authentication system granting access to digital systems and content involves a mobile device, a computing device and a server. The authentication system granting access to computing systems and devices and physical locations involves a mobile device, an interface device, a secure system and a server. The authentication systems described permit a user to access digital systems and content, computing systems and devices and physical locations using only the user's mobile device. The mobile device runs mobile application that performs the authentication functionality using biometric data obtained on the mobile device. The authentication data is stored on the mobile device in an encrypted format and is not shared with the other devices in the authentication system.

12 Claims, 7 Drawing Sheets

(51) Int. Cl.
  *G06F 21/45* (2013.01)
  *H04W 12/06* (2021.01)

(56) References Cited

U.S. PATENT DOCUMENTS

| | | | | |
|---|---|---|---|---|
| 7,941,664 | B2* | 5/2011 | Wheeler | G06Q 20/4014 |
| | | | | 713/170 |
| 7,945,034 | B2* | 5/2011 | Gonen | H04M 15/858 |
| | | | | 379/142.05 |
| 8,462,920 | B2 | 6/2013 | Gonen et al. | |
| 8,687,038 | B2 | 4/2014 | Gonen et al. | |
| 8,914,855 | B2* | 12/2014 | Whitmyer, Jr. | G06F 21/34 |
| | | | | 726/5 |
| 9,088,556 | B2* | 7/2015 | Truskovsky | G06F 21/45 |
| 9,300,792 | B2 | 3/2016 | Gonen et al. | |
| 9,467,443 | B2* | 10/2016 | Mohan | H04L 63/0846 |
| 9,762,392 | B2 | 9/2017 | Carrer et al. | |
| 9,767,262 | B1* | 9/2017 | Canavor | H04L 9/3226 |
| 9,860,241 | B2* | 1/2018 | Dixon | H04L 63/0807 |
| 10,021,088 | B2* | 7/2018 | Innes | H04L 63/0853 |
| 10,055,575 | B2* | 8/2018 | Adams | H04L 63/06 |
| 10,146,931 | B1* | 12/2018 | Kronrod | G06F 21/46 |
| 10,339,293 | B2 | 7/2019 | Yang et al. | |
| 2004/0193925 | A1* | 9/2004 | Safriel | G06F 21/31 |
| | | | | 726/6 |
| 2006/0104224 | A1* | 5/2006 | Singh | G07C 9/37 |
| | | | | 370/310 |
| 2006/0183462 | A1* | 8/2006 | Kolehmainen | H04W 12/003 |
| | | | | 455/411 |
| 2007/0074038 | A1* | 3/2007 | Arenburg | H04L 9/3236 |
| | | | | 713/181 |
| 2008/0010674 | A1* | 1/2008 | Lee | G06F 21/34 |
| | | | | 726/7 |
| 2009/0042541 | A1* | 2/2009 | Yi | H04L 63/0861 |
| | | | | 455/411 |
| 2013/0179692 | A1* | 7/2013 | Tolba | H04L 63/0838 |
| | | | | 713/179 |
| 2013/0254856 | A1* | 9/2013 | Krishan | H04L 63/083 |
| | | | | 726/6 |
| 2014/0101453 | A1* | 4/2014 | Senthurpandi | G06F 21/32 |
| | | | | 713/172 |
| 2014/0173708 | A1* | 6/2014 | Garlick | H04W 12/0608 |
| | | | | 726/7 |
| 2014/0189808 | A1* | 7/2014 | Mahaffey | H04L 63/0853 |
| | | | | 726/4 |
| 2014/0337930 | A1* | 11/2014 | Hoyos | G06Q 20/40145 |
| | | | | 726/4 |
| 2015/0143490 | A1* | 5/2015 | Fang | G06F 21/41 |
| | | | | 726/6 |
| 2015/0278510 | A1* | 10/2015 | Alexander | H04W 12/0802 |
| | | | | 726/6 |
| 2015/0295930 | A1* | 10/2015 | Dixon | H04L 63/0876 |
| | | | | 713/181 |
| 2016/0057136 | A1* | 2/2016 | Wang | H04L 63/083 |
| | | | | 713/172 |
| 2016/0063235 | A1* | 3/2016 | Tussy | G06Q 20/40145 |
| | | | | 726/6 |
| 2016/0269403 | A1* | 9/2016 | Koutenaei | H04L 63/107 |
| 2016/0359864 | A1 | 12/2016 | Dhaliwal et al. | |
| 2016/0379220 | A1 | 12/2016 | Tunnell et al. | |
| 2017/0076293 | A1* | 3/2017 | Cage | H04L 63/0853 |
| 2017/0085563 | A1* | 3/2017 | Royyuru | G06Q 20/3223 |
| 2017/0086069 | A1* | 3/2017 | Liu | H04L 63/18 |
| 2017/0142191 | A1 | 5/2017 | Caldwell | |
| 2017/0201513 | A1* | 7/2017 | Krempel | H04L 63/0428 |
| 2017/0310663 | A1 | 10/2017 | Krishan | |
| 2018/0005209 | A1 | 1/2018 | Ranganathan et al. | |
| 2018/0075231 | A1* | 3/2018 | Subramanian | G06F 16/86 |
| 2018/0176222 | A1 | 6/2018 | Bhaskar et al. | |
| 2018/0183779 | A1 | 6/2018 | Krishan | |
| 2019/0066114 | A1* | 2/2019 | Ross | G06F 21/32 |
| 2019/0213430 | A1* | 7/2019 | Schwartz | G06K 9/00422 |
| 2019/0370583 | A1 | 12/2019 | Van Os et al. | |

OTHER PUBLICATIONS

Wang, et al., IDKeeper: A Web Password Manager with Roaming Capability Based on USB Key, 2012 International Conference on Industrial Control and Electronics Engineering, pp. 1228-1231.

Yang, et al., Cloud Password Manager Using Privacy-Preserved Biometrics, 2014 IEEE International Conference on Cloud Engineering, pp. 505-509.

Chrome Plugin (Screenshots "SS"), Published Jan. 2015, by iKeyPass, Inc., retrieved from https://chrome.google.com/webstore/detail/byoa/nbnkenkheongccomnjibebdfilcpcefn?hl-en (3 pages).

iKeyVault Website (Screenshots "SS"), Published Oct. 2016, developed by Janani Mohan, retrieved from www.ikeyvault.com (3 pages).

Third-Party Submission Under 37 CFR 1.290 dated Feb. 11, 2018, filed with the U.S. Patent & Trademark Office against U.S. Appl. No. 15/636,827 (3 pages).

Wordpress Plugin (Screenshots SS), first published Oct. 2014, by iKeyPass, Inc., retrieved from https://wordpress.org/plugins/search/ikeypass/.

PCT International Search Report & Written Opinion dated Jun. 25, 2019 in Int'l PCT Patent Appl. Serial No. PCT/US2019/013716 (0410).

Agholor, et al., A Secured Mobile-Based Password Manager, 2016, IEEE (pp. 103-108).

International Search Report & Written Opinion dated Sep. 14, 2020 in Int'l PCT Patent Appl. Serial No. PCT/US2020029650 (0510).

* cited by examiner

METHOD AND SYSTEM FOR PERFORMING USER AUTHENTICATION

CROSS-REFERENCE TO RELATED APPLICATIONS

This application claims the benefit of U.S. Provisional Patent Application No. 62/618,209, filed on Jan. 17, 2018, the entire contents of which are incorporated herein by reference.

TECHNICAL FIELD

The present disclosure generally relates to the field of security authentication. More specifically, the present disclosure relates to a system and method for performing user authentication for access to digital systems and content, computing systems and devices, and physical locations.

BACKGROUND

While advanced computing systems and the Internet have made it easier to access digital information and computer devices, it has also made it increasingly difficult to restrict access to digital information, computing devices and even physical locations as modern technology has introduced several vulnerabilities that can easily be exploited. Though user verification systems are often employed to restrict access to certain information, devices, computer systems or physical locations, these systems may be inappropriately accessed through deception and/or hacking or by otherwise bypassing verification systems. Further, users may permit unauthorized access to the foregoing by sharing user name and/or password information.

With respect to access to digital content and computer devices and systems, unique usernames and password combinations may help protect against unauthorized access. However, users often forget usernames and passwords as users typically have multiple online accounts, each with a different username and password. Also, the users may leave their usernames and passwords in plain view or may use generic passwords that can be easily determined. While solutions such as token generators and one-time passwords (OTP) have been developed, these solutions are prone to being tampered with and/or hacked. Also, these solutions are often overly complex and costly and may even require users to carry separate devices that generate tokens or passwords, which can be easily misplaced.

Regarding access to physical locations, several well-known approaches exist. For example, physical key cards that have unique digital identifiers may be used in combination with proximity readers to grant users access through doors or gates. However, these systems can be expensive and require users to keep key cards on their person. Further, if the key card may be used by unauthorized individuals to gain access to the restricted area. Access to physical locations may also be granted by entering in a unique passcode. However these systems require a computing device that is prone to the same vulnerabilities described above with respect to digital authentication.

Accordingly, there is a need for improved methods and systems for performing user authentication involving a simple authentication process that is cost efficient, less susceptible to hacking and unauthorized password sharing, and otherwise overcomes one or more of the above-mentioned problems and/or limitations.

SUMMARY OF THE INVENTION

The present invention is directed to an authentication system for authenticating a user to provide access to digital systems and content, computing systems and devices, and physical locations. The authentication system preferably involves software that runs on at least one mobile device having at least one biometric sensor and at least one computing device that may be an interface device. The mobile device runs a mobile application and includes a display having a user interface. The authentication system may further include software that runs on at least one server that communicates with the mobile device. The mobile device is in communication with the computing device or interface device. The server is in communication with the computing device or interface device and may be in communication with the mobile device.

The authentication system may provide access to a website or a web portal. To access the website or web portal, a user may download the mobile application to the mobile device. An application may also be downloaded to the computing device upon which the website or web portal is accessed. Alternatively, the application may be downloaded on the backend of the website or web portal on a server. Using the mobile application, the user will set up a user profile and provide user identification information, authentication data include biometric data, and credential information (e.g., website usernames and passwords) to access certain websites or web portals. The user identification information (e.g., phone number and/or any other unique mobile device identifier) and the credential information will be shared with the server. The authentication data will be saved on the mobile device.

A user will initiate communication between the devices and provide the application on the computing device user identification information that will be validated by the server. A request for authentication data will be sent to the mobile device and the mobile application will prompt the user to generate authentication data including biometric information using the biometric sensor. The mobile application will compare the authentication data generated to the authentication data in the user's profile to validate the authentication data. The mobile application will inform the server that the user has been validated and the credential information will be sent to the web site or web portal for access to the website or web portal.

The authentication system for access to a computing device, digital information or functionality, physical location or object involves a computing device in the form of an interface device that may or may not involve a display and that interfaces with the mobile device as well as a secure system having an open and closed position. A similar approach may be employed to gain access to the secure system involving the user using the mobile application to create a user profile and validating the user on the mobile device using authentication data generated by the mobile application.

In accordance with the principles of the invention, the mobile device may implement the authorization system by executing a mobile application on the mobile device. A user using the mobile device may cause the mobile application to transmit first user identification information to a server. The user may then use the mobile application to generate first authentication data using a biometric sensor on the mobile device and save the first authentication data to the mobile device. Upon receiving a request for second user identification information from a computing device, the mobile application may send second user identification information to a computing device or server. Next the mobile device may receive a request for second authentication data and in response a user may use the mobile application to generate second authentication data using the biometric sensor on the mobile device. The mobile application may compare the first authentication data to the second authentication data and may determine whether the second authentication data corresponds to the first authentication data. The mobile application may then transmit a message to the computing device confirming that the authentication was successful if the second authentication data is determined to correspond to the first authentication data. A non-transient memory medium operatively coupled to at least one processor in the mobile device may be configured to store a plurality of instructions to perform the foregoing operations and tasks.

In accordance with the principles of the invention, a computing device may implement the authorization system by executing an application on the computing device that generates a request for user identification information and transmit the request for the user identification information to a mobile device. The application executed on the computing device may receive the user identification information from the mobile device and transmit the user identification information to a server. Next the application executed on the computing device may receive a message from the server confirming that the user identification information is valid. In response, the application may generate a request for authentication and may transmit the request for authentication to the mobile device. The computing device may then receive a message from the mobile device confirming that the authentication was successful. The application executed on the computing device may then generate a request for credential information from the server and transmit the request for credential information to the server. The application executed on the computing device may then receive credential information from the server. A non-transient memory medium operatively coupled to at least one processor in the computing device may be configured to store a plurality of instructions to perform the foregoing operations and tasks.

The foregoing and other features of the present invention will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

The present invention is directed to a user authentication system that performs authentication tasks to grant a user access to a digital content, computing systems and devices and/or physical locations or objects. The user authentication system involves a mobile device that runs a user authentication application that performs authentication tasks and communicates with at least one other computing device to access to digital content, computing systems and devices and/or physical locations or objects upon successful authentication.

Figure 1:
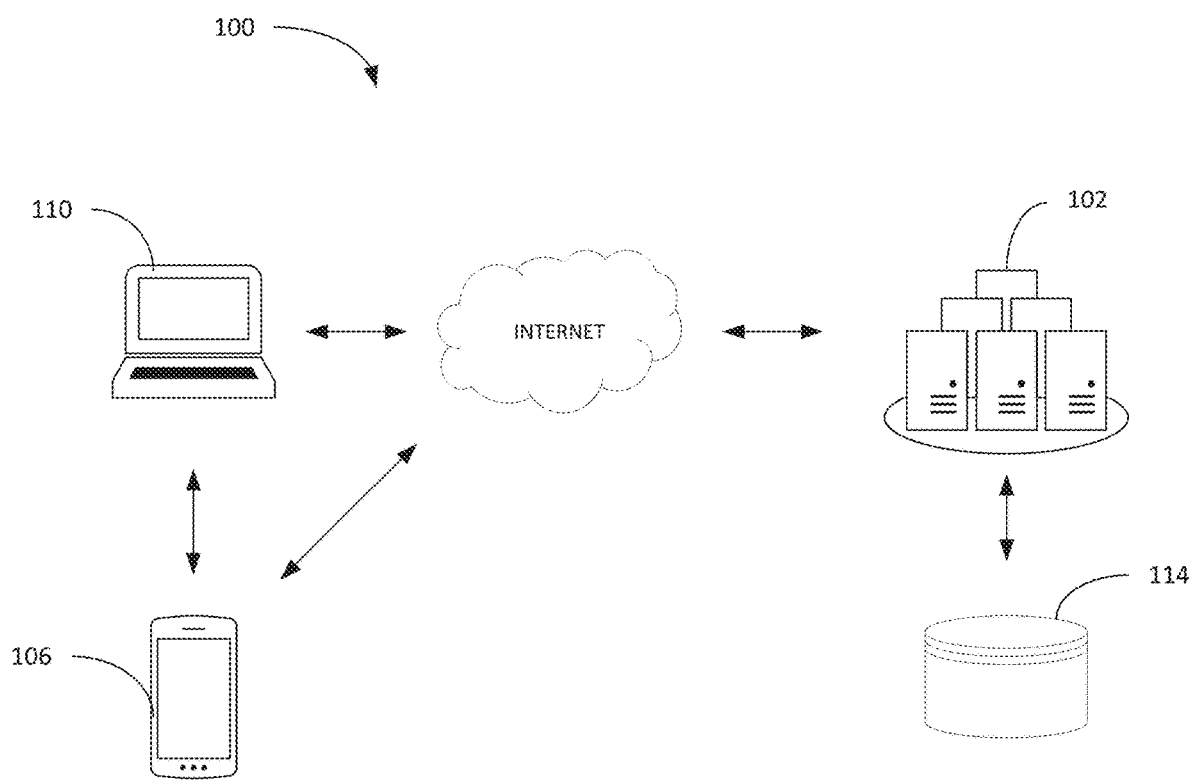
FIG. 1 illustrates an exemplary authentication system for granting access to digital content in accordance with aspects of the present invention.

Referring now to FIG. 1, exemplary user authentication system 100 is illustrated. User authentication system 100 is designed to perform user authentication on mobile device 106 and grant access to digital content and systems. For example, user authentication system 100 may grant a user using mobile device 106 access to a web browser, a web portal or other software systems.

User authentication system 100 involves mobile device 106, computing device 110, server 102 and database 114. Mobile device 106 may be any device having processing power, storage, network connectivity, an input device, a display and preferably at least one biometric sensor. For example, mobile device 106 may be a mobile phone, personal computer, laptop, tablet or any other computing device having the foregoing features. Computing device 110 may be any device having processing power, storage, network connectivity, an input device and a display. For example, computing device 110 may be a laptop, personal computer, mobile phone, tablet or any other computing device having the foregoing features. Server 102 is one or more servers that is hosted and delivered through a cloud computing platform over the Internet, such as, for example, a cloud computing service. Server 102 may have the same components as computing device 110 but includes at least processor and network connectivity. Database 114 is a database that may include information such as the user profile, user identification information, authorization information, registration information, and/or credential information, as defined below, as well other information relevant to the authentication system. Database 114 may be stored on or otherwise incorporated into or part of server 102 or may be stored elsewhere and accessed by server 102.

Mobile device 106 is configured to run mobile application 318. Mobile application 318 may be any mobile software application configured to run on mobile device 106 and generate a user interface on mobile device 106, and programmed to perform the tasks executed on mobile device 106 described herein. Computing device 110 is configured to run application 220. Application 220 is a software application that may be web-based and that is configured to be executed on computing device 110 and/or hosted on server 102 and accessed via computing device 110.

Mobile device 106 running mobile application 318 may communicate with computing device 110 running application 220 to perform the operations herein described with respect to authentication system 100. Application 220 may be installed by the user on computing device 110 or installed on the backend of a website or web-based application. Mobile device 106 may communicate with computing device 110 via any well-known wired or wireless connection, described in further detail below. Mobile device 106, running mobile application 318, may connect to the Internet using any well-known methods and may communicate with computing device 110 and/or server 102 over the Internet. It is understood that mobile device 106 may communicate with computing device 110 and server 102 using different communication technologies or the same communication technologies. It is further understood that in some cases mobile device 106 may communicate directly with server 102 (e.g., over the Internet). Where database 114 is not stored on server 102, server 102 may access database 114 over the Internet or over any well-known wired or wireless connection.

Figure 2A:
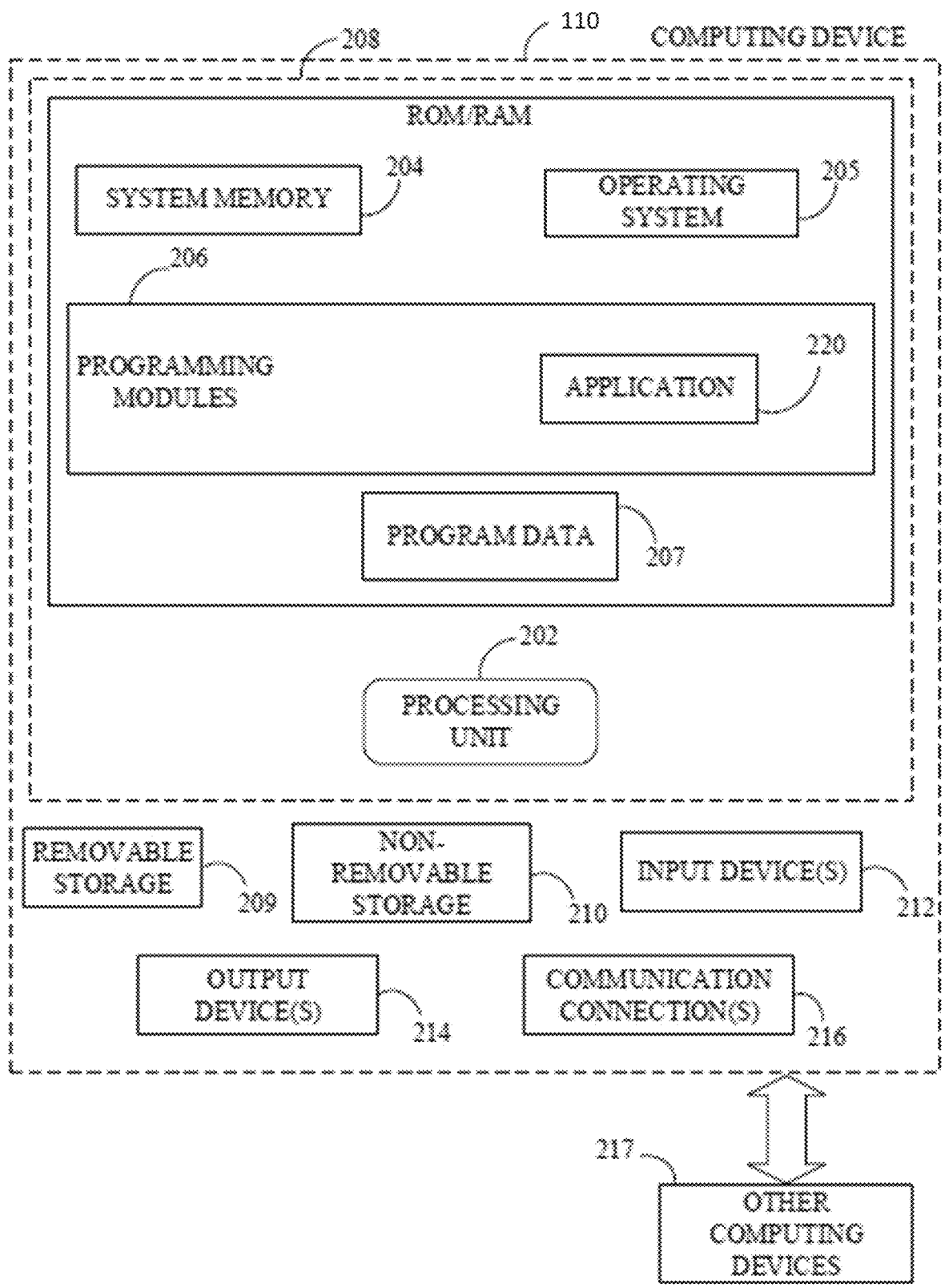
FIGS. 2A-2B are schematic views of exemplary electronic and hardware components of the computing device and the mobile device.
Figure 2B:
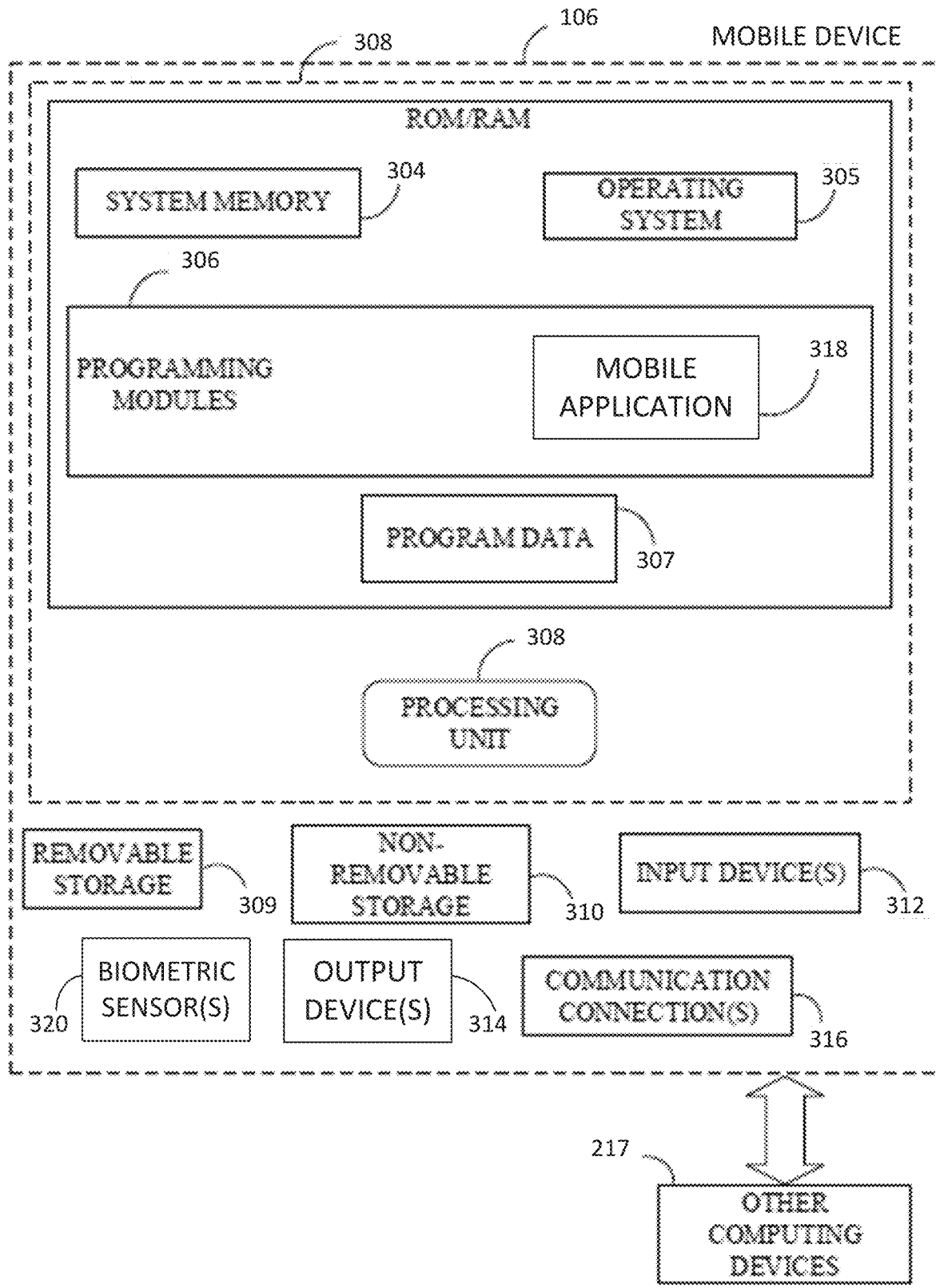

Referring now to FIGS. 2A and 2B, exemplary functional blocks representing the software and hardware components of computing device 110 and mobile device 106 are illustrated. As is shown in FIG. 2A, computing device 110 may include processing unit 202 and system memory 204. Processing unit 202 may be any processor configured to run application 220 and perform the tasks and operations of computing device 110 set forth herein. System memory 204 may comprise, but is not limited to, volatile (e.g. random-access memory (RAM)), non-volatile (e.g. read-only memory (ROM)), flash memory, or any combination thereof. Operating system 205 and one or more programming modules 206 as well program data 207 may be run on computing device 110. Operating system 205 may be suitable for controlling computing device 110's operation. Programming modules 206 may optionally include image processing module, machine learning module and/or image classifying module. It is understood that computing device 110 may be practiced in conjunction with a graphics library, other operating systems, or any other application program.

Computing device 110 may have additional features and functionality. For example, computing device 110 may also include additional data storage devices (removable and/or non-removable) such as, for example, magnetic disks, optical disks, or tape. Such additional storage is illustrated in FIG. 2A by a removable storage 209 and a non-removable storage 210. Computer storage media may include volatile and nonvolatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 110. Any such computer storage media may be part of computing device 110. Computing device 110 may also have input device(s) 212 such as a keyboard, a mouse, a pen, a sound input device, a touch input device (e.g., touch pad or touch screen), a location sensor, a camera, etc. Output device(s) 214 such as a display, speakers, a printer, etc. may also be included. Output device 214 may display a user interface.

Computing device 110 may also contain communication connection 216 that may allow computing device 110 to communicate with mobile device 106, server 102 and any other computing devices 217 within or in communication with authentication system 100 over any well-known wired or wireless connection, and (e.g., cellular, Near Field Communication (NFC), Wi-Fi Direct (P2P), Bluetooth, USB, radio frequency (RF and RFID), infrared, etc.) including over any well-known standard such as any IEEE 802 standard. Communication connection 216 may be embodied or otherwise facilitated by computer readable instructions, data structures, program modules, or other data in a modulated data signal. The term "modulated data signal" may describe a signal that has one or more characteristics set or changed in such a manner as to encode information in the signal.

As stated above, a number of program modules and data files may be stored in system memory 204, including operating system 205. While executing on processing unit 202, application 220 and/or programming modules 206 may perform processes including, for example, one or more stages of methods, algorithms, systems, applications, servers, databases as described herein. For example, programming modules 206 and/or application 220 permits computing device 110 to interface with mobile device 106 running mobile application 318 and server 102, as described in more detail below with respect to FIG. 3. Application 220 may be a browser extension (i.e., web browser plug-in) that extends the functionality of a web browser to include the authentication functionality described in more detail below. Alternatively, application 220 may be an extension on the back-end of a website (e.g., website generated by www.wordpress.com) and hosted on server 102 or a different server. In other configurations, application 220 may be embodied as, for example, but not be limited to, a website, a web application, a desktop application, and/or a mobile application compatible.

Other programming modules that may be used in accordance with embodiments of the present disclosure may include sound encoding/decoding applications, machine learning application, encryption/decryption applications, acoustic classifiers etc. Generally, program modules may include routines, programs, components, data structures, and other types of structures that may perform particular tasks or that may implement particular abstract data types. It of course is understood that computing device 110 may include additional or fewer components than those illustrated in FIG. 2A and may include more than one of each type of component.

Referring now to FIG. 2B, exemplary functional blocks of mobile device 106 are shown. As is shown in FIG. 2B, mobile device 106 may include processing unit 302 and system memory 304. Processing unit 302 may be any processor configured to run mobile application 318 and perform the tasks and operations set forth herein with respect to mobile device 106. System memory 304 may comprise, but is not limited to, volatile (e.g. random-access memory (RAM)), non-volatile (e.g. read-only memory (ROM)), flash memory, or any combination.

Operating system 305 and one or more programming modules 306 as well program data 307 may be run on computing device 110. Operating system 305 may be suitable for controlling the operation of mobile device 106. Programming modules 306 may optionally include image processing module, machine learning module and/or image classifying module. It is understood that mobile device 106 may be practiced in conjunction with a graphics library, other operating systems, or any other application program.

Mobile device 106 may have additional features and functionality. For example, mobile device 106 may also include additional data storage devices (removable and/or non-removable). Such additional storage is illustrated in FIG. 2B by a removable storage 309 and a non-removable storage 310. Mobile device 106 may include volatile and nonvolatile, removable and non-removable media implemented in any method or technology for storage of information, such as computer-readable instructions, data structures, program modules, or other data. System memory 304, removable storage 309, and non-removable storage 310 are all computer storage media examples (i.e., memory storage.)

Mobile device 106 may also have input device(s) 312 such as a keyboard, a mouse, a pen, a sound input device, a touch input device, a location sensor, a camera, etc., as well as output device(s) 314 such as a display, speakers, etc., for example. Mobile device 106 further includes biometric sensor 320 which may be one or more biometric sensors each configured to obtain biometric data of the user. Biometric sensor may be, for example, a camera, a finger print scanner, a retina scanner, a microphone, an infrared camera, thermal imaging camera, or any other sensor or input device suitable for biometric measurements. Biometric sensor(s) 320 may be a combination of hardware and software built into mobile device 106 and executed on processing unit 302. Biometric sensor 320 may employ, for example, one more of the following: well-known retina scan functionality that may involve analyzing an image of the blood vessel pattern in the light-sensitive surface lining the individual's inner eye; well-known iris pattern identification functionality that may involve analyzing a unique pattern within the ring-shaped region surrounding the pupil of the eye; well-known finger print identification functionality that may involve identifying a pattern of raised areas and branches in an image of a human finger; well-known finger vein identification functionality that may involve identifying a unique vascular pattern in an individual's finger; well-known face scan technology that may involve analyzing multiple nodal points on a human face and; well-known voice recognition functionality that may involve the identification of one or more of voice pitch, tone, inflection and/or speaking style and may rely on characteristics created by the shape of the speaker's mouth and throat.

Mobile device 106 may also contain communication connection 316 that may allow mobile device 106 to communicate with computing device 110, server 102 and any other computing devices 217 over any well-known wired or wireless connections. Communication connection 316 may be embodied or otherwise facilitated by computer readable instructions, data structures, program modules, or other data in a modulated data signal.

As stated above, a number of program modules and data files may be stored in system memory 304, including operating system 305. While executing on processing unit 302, programming modules 306 may perform processes including, for example, one or more stages of methods, algorithms, systems, applications, servers, databases as described herein. For example, programming modules 306 includes mobile application 318 that performs authentication functionality executed on mobile device 106 and described herein. Other programming modules that may be used in accordance with embodiments of the present disclosure may include encoding/decoding applications, for example. It of course is understood that mobile device 106 may include additional or fewer components than those illustrated in FIG. 2B and may include more than one of each type of component.

Figure 3:
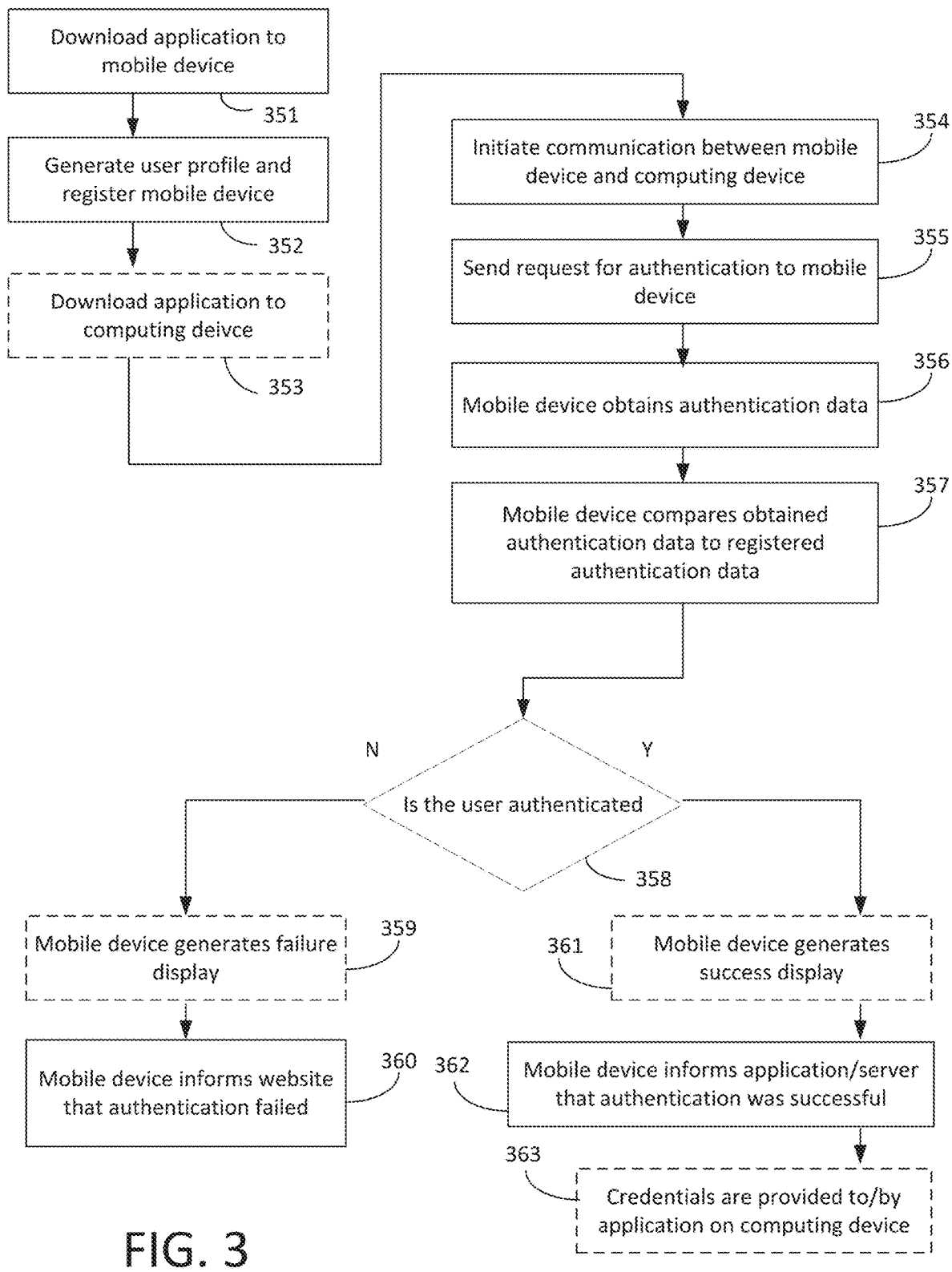
FIG. 3 is a flow chart illustrating an embodiment of the operations and decisions made in implementing the authentication system for granting access to digital content.

Referring now to FIG. 3, a flowchart is illustrated detailing the data flow and decisions made in implementing authentication system 100. As mentioned above, authentication system 100 may be used to authenticate a user using mobile device 106. Upon authenticating a user on mobile device 106 using biometric data, mobile device 106 will provide certain credentials to application 220 to grant the user access to a web browser, a web portal or other software systems. It is understood that the process set forth in FIG. 3 applies whether application 220 is installed on the computing device, a browser extension, and/or incorporated into the backend of a website.

To initiate the process set forth in FIG. 3, at step 351 the user downloads mobile application 318 on mobile device 106. The user may download mobile application 318 from the Internet. For example, the user using mobile device 106 may access the Apple or Google application store over the Internet, or any other website or application that provides access to downloadable applications. Mobile application 318 may then be installed on mobile device 106.

Upon downloading mobile application 318 on mobile device 106, at step 352 the user may register and generate a user profile using mobile application 318. The registration process may require the user to provide user identification information. Alternatively, the mobile application 318 may automatically retrieve user identification information from mobile device 106. The user identification information may be the phone number associated with mobile device 106 of the user or a different alphanumeric identifier of the user and unique to the user. Yet further, the user identification information may be any other unique identifier which may be linked to the phone number associated with the mobile device 106 of the user or other unique identifier (such as Media Access Control (MAC) address) associated with mobile device 106 of the user. For example, the User ID may be a mobile identification number (MIN), mobile subscription identification number (MSIN), Electronic Serial Number (ESN), Mobile Equipment Identifier (MEID), International Mobile Equipment Identity (IMEI), and/or international mobile subscriber identity (IMSI), or any other identifier unique to mobile device 106. The user profile may include at least the user identification information and may additionally include information about the user and/or the mobile device and/or any other user information. The user profile may be saved on server 102 as well as computing device 110, mobile device 106 and/or database(s) 114.

Further, the registration process may require the user to generate authentication data unique to the user. Authentication data may include a conventional passwords, including a One-Time password (OTP), tokens or SMS text (e.g., numbers/code), as well biometric data such as retina scan information, iris pattern information, finger print scan information, finger vein scan information, face scan information, voice pattern information.

For example, upon downloading mobile application 318 to mobile device 106, mobile application 318 may instruct the user to select one or more authentication methods and/or may prompt the user to generate authentication data using one or more biometric sensors 320 according to preprogrammed and preselected authentication methods. In this example, mobile application 318 may prompt the user to place their thumb on a first biosensor which may be a thumbprint scanner. Next, mobile application 318 may prompt the user to take a picture of their eye user a second biosensor that is a camera.

The authentication data will be saved locally mobile device 106. The authentication data may be stored in an encrypted format on mobile device 106 to protect the user's privacy. As user authentication is performed by mobile device 106, the authentication data need not be communicated to any other device. However, in some configurations, the authentication data may be shared with and saved on the remote server.

Finally, the registration process includes collecting user credentials for each website or application that the user intends to access using authentication system 100. For example, mobile application 318 may prompt the user to identify one or more websites and for each particular website to provide user credentials (e.g., user name or information, password information and any other information required for access to that website), referred to as credential data. Credential data may be stored in an encrypted format on mobile device 106. Alternatively, or in addition to, the credential data may be shared with and stored in an encrypted format on server 102, database 114 and/or computing device 110.

To permit mobile device 106 to communicate with computing device 110, at step 353 the user must also download application 220 to computing device 110. The user may access the application 220 via a website or application store (e.g., Apple or Google app store) as discussed above. Alternatively, in some cases, application 220 may be may be an extension on the backend of a website (e.g., website generated by www.wordpress.com) and may be hosted on server 102 or a different server. Where application 220 is an extension on the backend of a website, the user need not download application 220 to computing device 110 and step 353 may be skipped. In another example, application 220 may be pre-installed on computing device 110.

To employ authentication system 100, at step 354, communication between mobile application 318 and application 220 may be initiated. As explained above, mobile device 106 and computing device 110 may communicate to one another via well-known short range communication methods such as Near Field Communication (NFC), Bluetooth, and Wi-Fi Direct (P2P) for example. Alternatively, mobile device 106 and computing device 110 and/or server 102 may communicate using other well-known communication methods. For example, mobile device 106 and computing device 110 may each be Wi-Fi compatible and may communicate with one another over the Internet.

Communication between mobile application 318 and application 220 may be initiated, for example, by clicking on an initiation icon on an altered browser generated by application 220. Upon clicking on the initiation icon, the browser may prompt the user to enter user identification information into computing device 110 such as the phone number corresponding to mobile device 106. Alternatively, the user may use the mobile application 318 to send user identification information from mobile device 106 to computing device 110. Computing device 110, running application 220, may share the user identification information with server 102.

Server 102 may confirm that the mobile number or other user identification information provided corresponds to user identification information for a registered user. Server 102 may communicate with database 114 to make this confirmation. Upon making this confirmation, server 102 may inform computing device 110 of the confirmation. Alternatively, where computing device 110 stores user profiles or at least user identification information, computing device 110 may confirm that the mobile number or other user identification information provided by the user corresponds to user identification information for a registered user.

Where application 220 is an extension on the back end of the website, at step 354 the user may initiate communication between mobile device 106 and computing device 110 by accessing the website via computing device 110. For example, upon opening the website, the website will prompt the user to enter a user name and password. Upon verifying that the user name and password are correct (e.g., by comparing the user name and password to a database on a remote server), the website will prompt the user to enter a phone number or other user identification information. Alternatively, upon visiting the website on computing device 110, the website may prompt the user to enter the user identification information. As is the case with the system involving the browser extension, the user identification information provided to the website may be shared with server 102. Server 102 and/or database(s) 114 may confirm that the mobile number or other user identification information provided corresponds to user identification information of a registered user.

Upon confirming that the user identification information provided corresponds to user identification information of a registered user, at step 355 application 220 via computing device 110, or alternatively server 102, will send a request for authentication to mobile device 106. At step 356 mobile device 106 running mobile application 318 will obtain authentication data. Mobile application 318 may be programmed to require a certain authentication data (e.g., password, fingerprint data, retina data, iris data, face data, voice data) to authenticate the user. Mobile application 318 may be programmed to have a bias for certain authentication methods according to a programmed hierarchy and may further be programmed to require a certain number of authentication methods. For example, mobile application 318 may be programmed to have a two-step authentication process involving authentication via thumb print and face recognition. In this example, mobile application 318 may first prompt the user to place his or her thumb on biometric sensor 320, which in this example is a fingerprint scanner, to obtain fingerprint data. Next, mobile application 318 will prompt the user to obtain an image or his or her face using a second biosensor, which in this example is a camera, to obtain face data.

At step 357, mobile device 106 running mobile application 318 may analyze authentication data using for example, well known fingerprint analysis, retina analysis, iris analysis, face analysis and voice analysis techniques. The data collected and/or the analyzed data will be compared to the authentication data corresponding to a user's profile and stored locally on mobile device 106. At decision 358, after comparing the data obtained at step 356 to the authentication data corresponding to the user's profile, mobile device 106 running mobile application 318 will determine whether the obtained data is the same or substantially similar to the authentication obtained during the registration process, and thus if the user has been authenticated. The degree to which the data must be similar may be set and altered by an administrator.

If mobile device 106 running mobile application 318 determines at decision 358 that the user is not authenticated (i.e., authentication data obtained at step 356 is not the same or substantially similar to authentication data obtained during registration), at step 359 mobile device 106 may optionally generate a message on the display of mobile device 106 that the authentication failed. Mobile device may repeat steps 356-358 a preset number of times or may even prompt the user to generate different biometric data (e.g., iris pattern scan) if the first attempt to authenticate failed. Further, at step 360 mobile device 106 running mobile application 318 may inform computing device 110 running application 220 and/or server 102 that authentication failed. Application 220 may also generate a message on the display of the computing device informing the user that authentication failed.

Conversely, if mobile device 106 running mobile application 318 determines at decision 358 that the user is authenticated, at step 361 mobile device 106 may optionally generate a message on the display of mobile device 106 that the authentication was successful. Further, at step 362, mobile device 106 will inform application 220 and/or server 102 that the authentication was successful.

At step 363, in response to a successful authentication, mobile device 106 and/or server 102 may communicate credentials to computing device 110 running application 220. The credentials may be communicated to application 220 via any of the well-known communication methods set forth above and may be transmitted in an encrypted format. The credentials will be specific to the website for which communication was initiated in step 364. Alternatively, where computing device 110 has been provided and stores the credential information, computing device 110 may provide the credential information.

In one example, computing device 110 may include a password manager module which may be a part of application 220 or may be a standalone software application run on computing device 110. A user may save passwords and various information, such as user names, using password manager module. This information may be saved locally on application 220 or may be saved on a remote server (e.g., server 102) and retrieved by application 220. Upon being informed that authentication was successful, application 220 may communicate with the password manager module to obtain certain credentials. Specifically, application 220 may generate a request for credential information from password manager module and/or transmit the request to password manager module. Upon receiving the request, password manager module may retrieve the requested credential information, either locally or from the remote server, and generate and/or transmit the requested credential information.

Application 220, upon receiving the credentials, may auto-populate the credentials into the corresponding fields and may automatically submit the credentials. Alternatively, application 220 may display the credentials on computing device 110 and the user may cut and paste or otherwise place the credentials into the appropriate location on the graphic user interface and manually submit the credentials. In this manner, the user using mobile device 106 may perform authentication on mobile device 106 to access the website on computing device 110.

In one example, server 102 may be a manager server managed by a company administrator using an administrator device. The manager server may be employed where a company seeks to limit and control access (e.g., employee access) to a company website or web portal. The manager server may run inside the enterprise network, on the cloud and/or a Blockchain based platform. It is understood that the manager server may also be used to control access to and otherwise manage authentication system 400, described below.

The manager server may maintain and manage user profile information including user identification information and even credential information relevant to that website or web portal. Administrators with access to manager server may oversee the manager server and set and alter user profile information, user identification, authorization information, registration information, and/or credential information. For example, the administrator may add or delete user profiles, limiting access to the website or web portal, and may determine how often the credentials for the website or web portal must be changed. The administrator may set the credential information for each user and the individual users (such as employees) may not be allowed to view the credentials information (passwords) though they may be only allowed to use (copy and paste) the passwords and/or auto-fill the passwords. Manager server may be controlled by a software installed on the manager server that interfaces with software on an administrator device. In one example, the manager server may include or may interface with a policy server programmed to dynamically change the credential information. The manager server and/or policy server may change the credential information necessary for access to the company system after a set period of time (e.g., every five minutes). The manager server and/or policy server may also change company policies related to the credential information (e.g., may modify the set period of time for changing passwords).

As explained above, communication between the mobile device and the computing device may be initiated and the user identification information may be requested. The user identification information will be communicated to the manager server to confirm that the user has been registered. Alternatively, if the user's computing device is within the corporate network (e.g., not accessing the website or web portal remotely) the user's computing device and manager server may interact directly via local network (such as Ethernet or Wi-Fi) and automatically confirm identification.

After confirming that the user has been registered, the manager server may send a request to the mobile device to authenticate the user. As explained above, the user may provide the required authentication data (such as face print, finger print, iris pattern, voice pattern) on the user's computing device (i.e., mobile device 106). Thereafter, the user's computing device may inform the manager server of whether the authentication was successful. If authentication was successful, then the password manager server sends the corresponding credentials (e.g., to the browser running the website or web portal to provide access to the corresponding website or web portal).

Further, a company (or employer) may also set access privileges. For example, if an employee leaves the company, the administrators may revoke access of the employee by deleting the user profile corresponding to that employee or otherwise altering the user profile to prevent access. Further, the manager server may track access by employees or other users. Also, manager server may limit access to certain information within website or web portal. For example, for more sensitive data, the company may allow access only to employees that have a certain security clearance. The manager server may also track the user devices that have installed the mobile application. The company may restrict access to the mobile application to only work phones and work computers. Using the administrator device, the administrators may also detect any suspicious devices accessing the manager server.

The steps and decisions set forth above with respect to FIG. 3 are applicable to web-based subscription streaming services that play media content (e.g., Netflix, Hulu, HBO Go, etc.). In one example, computing device 110 may be a television that connects to the Internet and permits the user to access the streaming services via a website or web-based application. The user may download a television application to the television and also download a mobile application to the user's mobile phone (i.e., mobile device 106), consistent with steps 351 and 353. The television application may interface with the website or web-based application and facilitate access to the subscription services. Using the application downloaded to the mobile phone, the user may generate a user profile and register the mobile device, as described above with respect to step 352. The user profile will include user identification information (e.g., phone number). The mobile phone will share the user identification information with the television which will send the user identification information to the remote server. Alternatively, the mobile phone will send the user identification information directly to the remote server. The user profile will also include a username and password (i.e., credential information) for the streaming services. The mobile phone will send that credential information to the television, which will save the user name and password on the television.

To access and otherwise use the streaming services, the user using the mobile phone may initiate communication with the television at step 354 by sending user identification information (e.g., phone number) to the television application unprompted. As explained above, the mobile phone and the television may connect via well-known short range communication methods such as Bluetooth or Wi-Fi Direct (P2P). Alternatively, the user may prompt the television application (e.g., using a remote control) to send nearby computing devices, or computing devices that the television is in short range communication with, a request for user identification information. Upon receiving the request for user identification information, the mobile application may automatically send user identification information to the television application or may send this information directly to the remote server. In both examples, where the television application receives user identification information, the television application will send this user identification information to the remote server over the internet.

As explained above with respect to steps 354 and 355, the remote server will confirm that the user identification information matches the user identification information saved on the server (i.e., confirm that the mobile device is registered) and will send a request for authentication to the mobile phone. Alternatively, the server may send the request for authentication to the television and the television may send the request for authentication to the mobile phone. The mobile phone will then authenticate the user as described above with respect to decision 358. In this example, the mobile application may authenticate the user by scanning the user's thumbprint using a thumbprint scanner on the mobile phone and comparing the thumbprint to the thumbprint generated during registration.

If the mobile application determines that the user is authenticated (e.g., the obtained fingerprint matches the fingerprint in the user's profile), the mobile phone will send a message to the television instructing the television that the user has been authenticated. Upon being instructed that the user has been authenticated, the television will retrieve credential information stored on the television to gain access to the streaming services.

It is understood that the mobile device used to communicate with computing device 110 in steps 354-363 may be a different mobile device than the mobile device used during the registration process in step 352 described above. It is further understood that a user may select one or more mobile numbers to affiliate a user profile with the mobile devices corresponding to one or more mobile numbers. If a different mobile device is used to communicate with computing device 110, user identification information may optionally involve information not specific to the mobile device used during registration. For example, user identification information may be alphanumeric information unique to the user. Further, where a different mobile device is used to communicate with computing device 110, the user profile information saved on server 102 will include authentication data saved in an encrypted format. In this configuration, upon receiving a request for authentication and obtaining authentication data at step 356, the mobile device will obtain authentication data and send the obtained authentication data to server 102. As the mobile device used to obtain authentication data does not have the authentication data generated during registration saved locally, server 102 will compare the obtained authentication data to the authentication data obtained during registration to authenticate the user. Server 102 will inform application 220 whether the user has been authenticated. Alternatively, server 102 will send the authentication data generated during registration to the mobile device and the mobile device will authenticate the user and inform application 220 whether the user has been authenticated.

Figure 4:
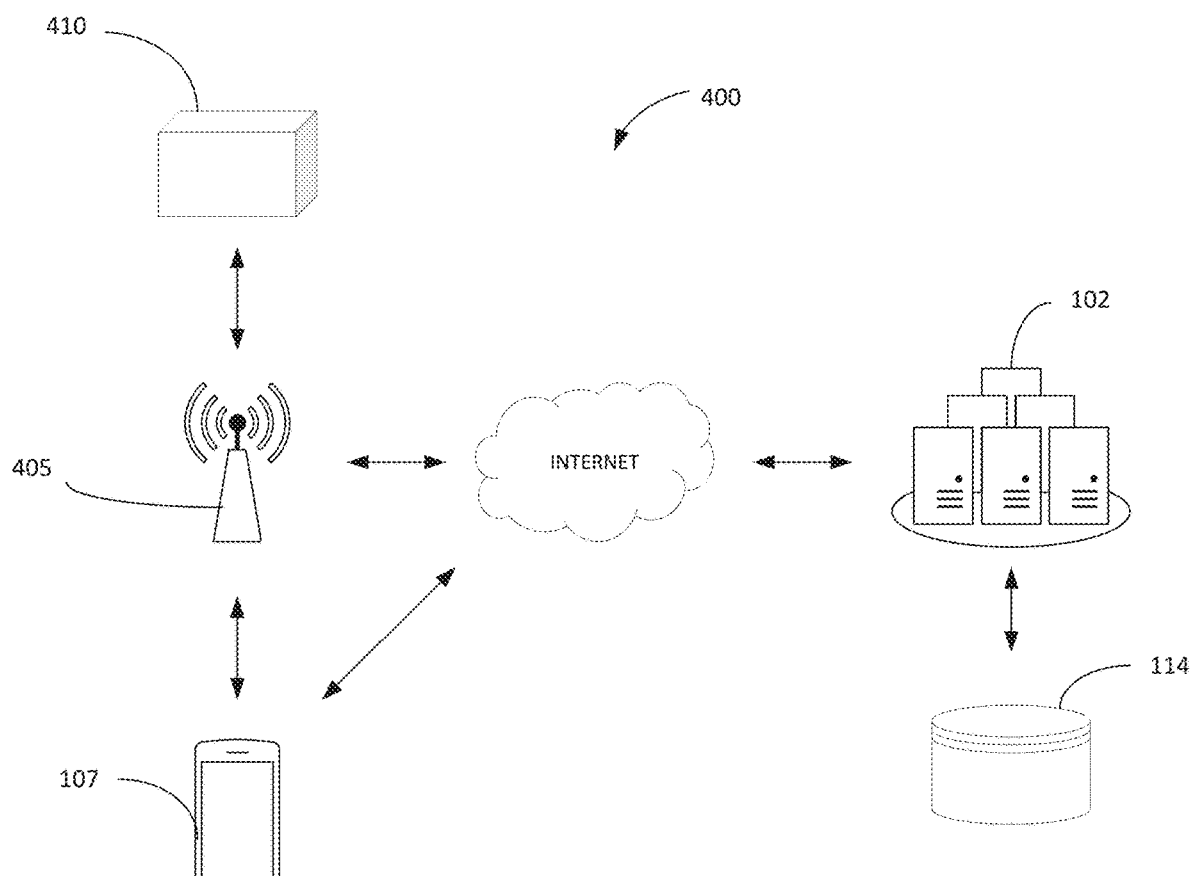
FIG. 4 illustrates an exemplary authentication system for granting access to a computing device or physical location.

Referring now to FIG. 4, authentication system 400 is illustrated. User authentication system 400 is designed to perform user authentication and grant a user access to a digital system or application or a physical location. For example, user authentication system 400 may grant a user using mobile device 107 access to computer device such as a desktop computer or to a physical location such as a building, room, restricted area or object (e.g., building, room, garage, parking lot or even a vehicle or locker).

User authentication system 400 involves mobile device 107, interface device 405, secure system 410 server 102 and database 114. Sever(s) 102 and database(s) 114 may be the same mobile device, servers and databases described above with respect to authentication system 100 and/or may be a manager server. Mobile device 107 is the same as mobile device 106 but instead of running mobile application 318, mobile device 107 runs mobile application 50 (not shown).

Interface device 405 may be any computing device having processing power, storage, and network connectivity and may optionally include an input device and a display. It is understood that interface device 405 may be a standalone computing device having standalone hardware and software modules or may be incorporated into secure system 410. In one example, interface device 405 may be a computing device having a mechanical button affixed to a portion of secure system 410.

Secure system 410 may be a physical barrier to a physical location such as a door, gate, arm, fence, or any other physical barrier. Secure system 410 may involve electronics and mechanical structure to permit the physical barrier to be locked and unlocked, or opened and/or closed. Alternatively, secure system 410 may be a computing device or even a software system or software application that has a locked configuration and an unlocked configuration. In the locked configuration, information and functionality may not be accessed by the user. Interface device 405 may optionally be incorporated into secure system 410 such that secure system 410 and interface device 405 share at least some hardware and/or software.

Mobile application 50 may be any mobile software application configured to run on mobile device 107 and generate a user interface on mobile device 107 and programmed to perform the tasks and operations executed on mobile device 107 described herein. Interface device 405 is configured to run software application 420. Mobile device 107 running mobile application 50 may communicate with software application 420 running on interface device 405 to perform the operations herein and otherwise facilitate user authentication.

Using mobile device 107 running mobile application 50, a user may communicate with interface device 405 running software application 420 via any well-known wired or wireless connection. Mobile device 107, running mobile application 50, may connect to the Internet using any well-known methods and may communicate with interface device 405 and/or server 102 over the Internet. It is understood that mobile device 107 may communicate with computing device 110 and server 102 using different communication technologies or the same communication technologies. It is further understood that, in some cases, mobile device 107 may communicate directly with server 102 (e.g., over the Internet).

Figure 5:
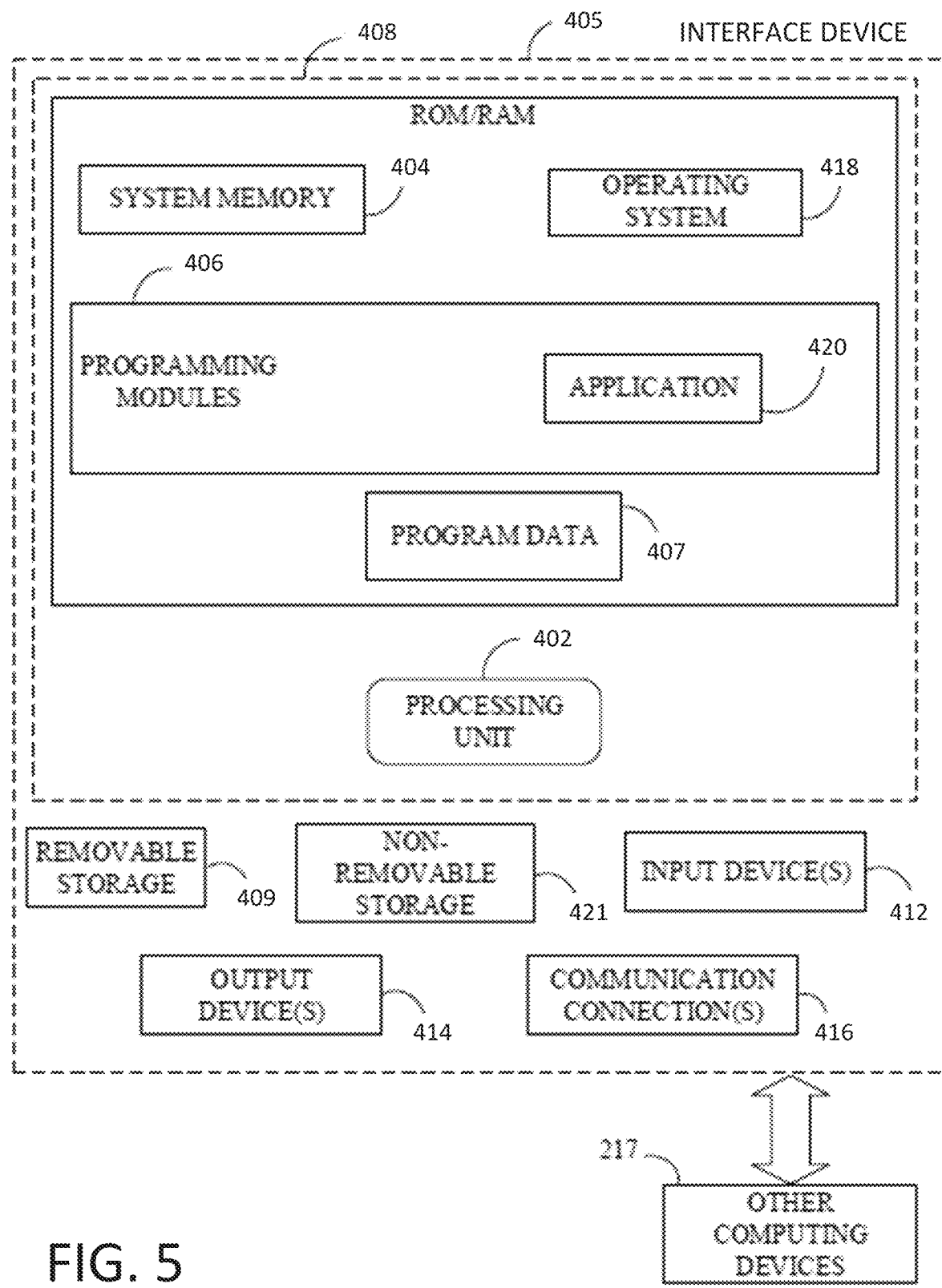
FIG. 5 is a schematic view of exemplary electronic and hardware components of the computing device and the mobile device.

Referring now to FIG. 5, exemplary functional blocks representing the software and hardware components of interface device 405 are illustrated. As is shown in FIG. 5, interface device 405 may include processing unit 402 and system memory 404. Processing unit 402 may be any processor configured to run software application 420 and perform the tasks and operations set forth herein. System memory 404 may comprise, but is not limited to, volatile (e.g. random-access memory (RAM)), non-volatile (e.g. read-only memory (ROM)), flash memory, or any combination. Operating system 418 and one or more programming modules 406 as well program data 407 may be run on computing device 110. Operating system 418 may be suitable for controlling the operation of interface device 405. Programming modules 406 may optionally include image processing module, machine learning module and/or image classifying module. It is understood that interface device 405 may be practiced in conjunction with a graphics library, other operating systems, or any other application program.

Interface device 405 may have additional features and functionality. For example, interface device 405 may also include additional data storage devices (removable and/or non-removable) such as, for example, magnetic disks, optical disks, or tape. Such additional storage is illustrated in FIG. 5 by a removable storage 409 and a non-removable storage 421. Computer storage media may include volatile and nonvolatile, removable and non-removable media implemented in any method or technology for storage of information, such as computer-readable instructions, data structures, program modules, or other data. System memory 404, removable storage 409, and non-removable storage 421 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by interface device 405. Any such computer storage media may be part of interface device 405. Interface device 405 may also have input device(s) 412 such as a keyboard, a mouse, a pen, a sound input device, a touch input device, a location sensor, a camera, etc. Input device 412 may also be a mechanical button or touch screen button. Output device(s) 414 such as a display, speakers, a printer, etc. may also be included. Output device 414 may display a user interface.

Interface device 405 may also contain communication connection 416 that may allow interface device 405 to communicate with mobile device 107, server 102 and any other computing devices 217 over any well-known wired or wireless connection. Communication connection 416 may be embodied or otherwise facilitated by computer readable instructions, data structures, program modules, or other data in a modulated data signal.

As stated above, a number of program modules and data files may be stored in system memory 404, including operating system 418. While executing on processing unit 402, programming modules 406 may perform processes including, for example, one or more stages of methods, algorithms, systems, applications, servers, databases as described herein. For example, programming modules 406 includes software application 420 that permits interface device 405 to interface with mobile device 107 running mobile application 50, server 102 and secure system 410, as described in more detail below. Software application 420 may be a stand-alone software application downloaded to and executed on interface device 405 or, alternatively may be hosted on server 102 and accessed via interface device 405. Other programming modules that may be used in accordance with embodiments of the present disclosure may include encoding/decoding applications, machine learning application, acoustic classifiers etc. Generally, program modules may include routines, programs, components, data structures, and other types of structures that may perform particular tasks or that may implement particular abstract data types. It of course is understood that interface device 405 may include additional or fewer components than those illustrated in FIG. 4 and may include more than one of each type of component.

Figure 6:
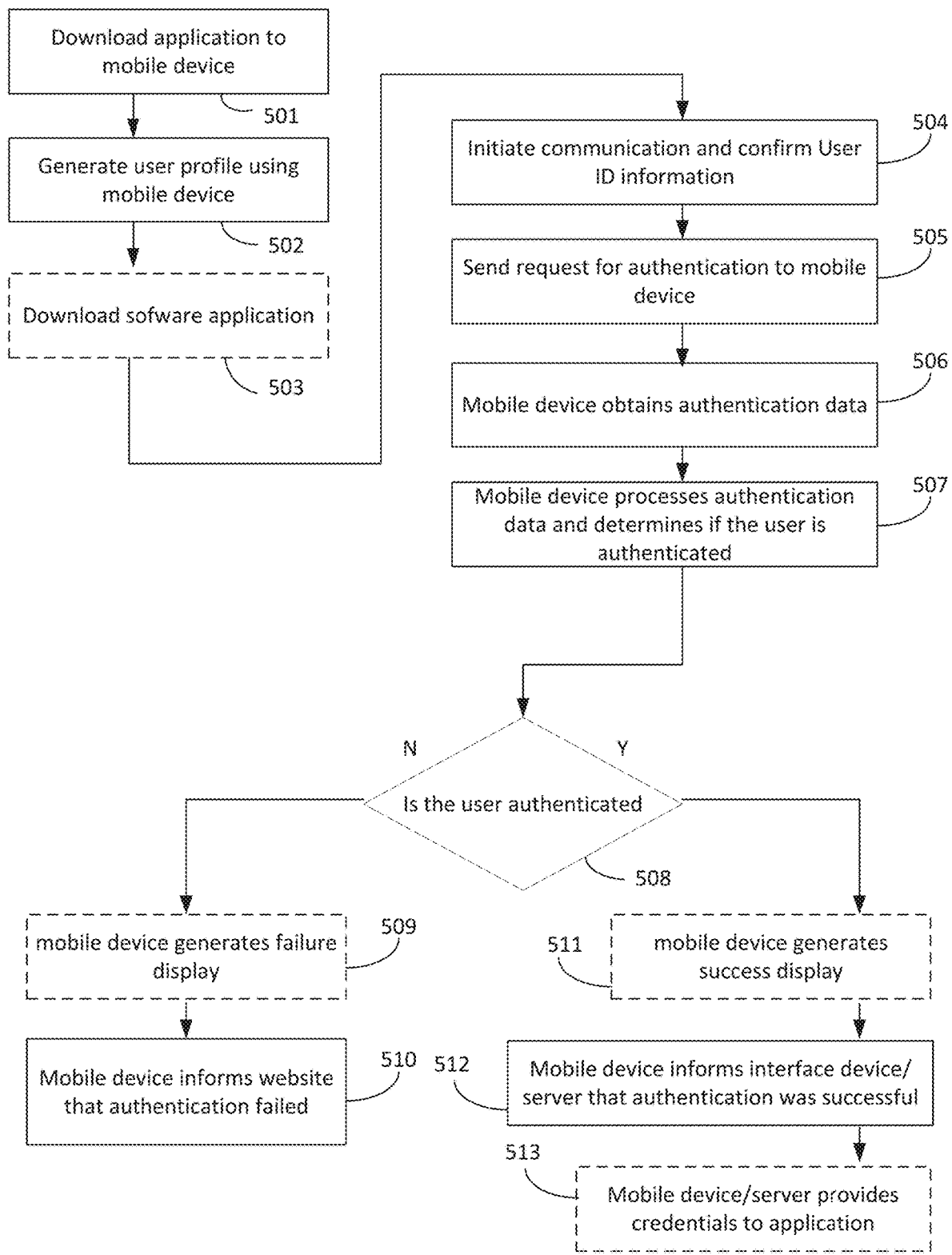
FIG. 6 is a flow chart illustrating an embodiment of the operations and decisions made in implementing the authentication system for granting access to a computing device or physical location.

Referring now to FIG. 6, a flowchart is illustrated detailing the data flow and decisions made in implementing authentication system 400. As mentioned above, authentication system 400 may be used to authenticate a user using mobile device 107. If the user is authenticated on mobile device 107 using biometric data, mobile device 107 will inform software application 420 that the user has been authenticated and software application 420 will communicate and cooperate with secure system 410 to grant the user access to digital content. In some configurations, mobile device 107 or server 102 may provide credentials to interface device 405 if necessary for access to secure system 410.

To initiate the process set forth in FIG. 6, at step 501 the user downloads mobile application 50 on mobile device 107. Similar to the process explained above with respect to mobile application 318 the user may download mobile application 50 from the Internet. For example, the user using mobile device 107 may access the Apple or Google application store over the Internet, or any other website or application that provides access to downloadable applications. Mobile application 50 may then be installed on mobile device 107.

Upon downloading mobile application 50 on mobile device 107, at step 502 the user may register using mobile application 50 similar to the registration process described above with respect to mobile application 318. For example, the user may provide user identification information such as a phone number associated with mobile device 107 of the user. The user identification information may be any other unique identifier which may be linked to the phone number associated with the mobile device 107 of the user (e.g., MAC address, MIN, MSIN, ESN, MEID, IMEI, and/or IMSI, or any other identifier unique to mobile device 107). The user identification information and any other the user registration information, referred to as registration data, may be saved on server 102 and/or databases 114.

Further, the registration process may require the user to set up a user profile that includes one or more authentication methods. For example, authentication methods may include a conventional passwords, including a One-Time password (OTP), tokens or SMS text (e.g., numbers/code), as well biometric authentication methods already discussed above such as, for example, retina scan, iris pattern identification, finger print identification, finger vein identification, face recognition, voice pattern recognition. Upon downloading mobile application 50 to mobile device 107, mobile application 50 will instruct the user to select one or more authentication methods and/or will prompt the user to generate authentication data using one or more biometric sensors 320.

The biometric data and password data (if applicable) collected by mobile device 107, referred to as authentication data, will be saved locally mobile device 107. The method for collecting and obtaining authentication data is the same as described above with respect to authentication system 100. The authentication data may be stored in an encrypted format on mobile device 107 to protect the user's privacy. As user authentication is performed by mobile device 107, the authentication data need not be communicated to any other device.

For applications where secure system 410 requires user credentials (e.g., user name and password/pin) for access to secure system 410 the registration process may optionally include collecting user credentials for each secure system 410 that requires credentials for access, referred to as secure system credential data. For example, where secure device is a computing device such as a desktop computer or an Automated Teller Machine (ATM), the user name and password for these systems may be obtained from the user using mobile device 107 running mobile application 50. The secure system credential data may be stored in an encrypted format on mobile device 107 and/or shared with server 102 and/or databases 114 and stored in an encrypted format on server 102 and/or databases 114.

As mentioned above, mobile device 107 running mobile application 50 may communicate with interface device 405 running software application 420. Interface device 405 may be initially designed and programmed with software application 420. Alternatively, at step 503, the user or an administrator with access to interface device 405 may download software application 420 to interface device 405. Where interface device 405 is initially designed and programmed with software application 420, step 503 may be skipped.

To employ authentication system 400, at step 504, communication between mobile device 107 running mobile application 50 and interface device 405 running software application 420 may be initiated. Communication may be initiated by, for example, the user pressing or otherwise engage input device 412 which may be a physical button or a button or a screen of interface device 405 that initiates communication. Upon clicking on input device 412, interface device 405 running software application 420 will send mobile device 107 running mobile application 50 a message requesting the user to provide user identification information such as the phone number corresponding to mobile device 106.

Alternatively, interface device 405 may have a proximity sensor or other sensor for sensing nearby computing devices such as mobile device 107. Interface device 405 may be programmed to automatically generate a request for user identification information upon detecting a nearby device. In yet another example, to initiate communication, the user may instruct mobile application 318 to send a user identification information from mobile device 107 to interface device 405 unprompted by interface device 405.

The user, using mobile device 107, will enter the requested user identification information into mobile device 107 which will transmit that information to interface device 405. Alternatively, mobile device 107 may be programmed to automatically respond to interface device 405 and provide user identification information stored on mobile device 107 or otherwise known to mobile device 107. Interface device 405 running software application 420 may share the user identification information with server 102. Server 102 and/or interface device 405 running software application 420 may confirm that the mobile number or other user identification information provided by mobile device 107 corresponds to a valid registered user. Server 102 may optionally communicate with database 114 to confirm that the user identification information corresponds to a valid registered user.

Upon initiating communication at step 504, at step 505 software application 420 via interface device 405 or server 102 will send a request for authentication to mobile device 107. At step 506, mobile device 107 running mobile application 50 will obtain authentication data. Like mobile application 318, mobile application 50 may be programmed to require one or more types of authentication data (e.g., password, fingerprint data, retina data, iris data, face data, voice data) to authenticate the user. Mobile application 50 may be programmed to have a biased for certain authentication methods according to a hierarchy and/or may require a certain number of authentication methods.

At step 507, mobile device 107 running mobile application 50 may analyze authentication data using, for example, well known fingerprint analysis, retina analysis, iris analysis, face analysis and voice analysis techniques. The data collected and/or the analyzed data will be compared to the authentication data corresponding to the user's profile and stored locally on mobile device 107. At decision 508, after comparing the data obtained at step 506 to the authentication data corresponding to the user's profile, mobile device 107 running mobile application 50 will determine whether the obtained data is the same or substantially similar to the data corresponding to the user's profile, and thus if the user has been authenticated.

If mobile device 107 running mobile application 318 determines at decision 508 that the user is not authenticated, at step 509 mobile device 107 may optionally generate a message on the display of mobile device 107 that the authentication failed. Mobile device may repeat step 506 and step 507 a preset number of times or may even prompt the user to generate different biometric data if the first attempt to authenticate failed. Further, at step 510 mobile device 107 running mobile application 50 may inform software application 420 and/or server 102 that authentication failed. Software application 420 may also generate a message on the display of the interface device 405, if interface device 405 includes a display, informing the user that authentication failed.

Conversely, if mobile device 107 running mobile application 50 determines at decision 508 that the user is authenticated (i.e., authentication was successful), at step 511 mobile device 106 may optionally generate a message on the display of mobile device 107 that the authentication was successful. Further, at step 512, mobile device 107 will inform software application 420 and/or server 102 that the authentication was successful.

At step 513, in response to a successful authentication, mobile device 106 and/or server 102 optionally may communicate credentials to interface device 405. The credentials may be communicated to software application 420 via any of the well-known communication methods set forth above and may be transmitted in an encrypted format. Alternatively, the credential information is provided to and saved locally interface device 405.

In one example, interface device 405 may include a password manager module which may be a part of software application 420 or may be a standalone software application run on interface device 405. A user may save passwords and various information, such as user names, using password manager module. This information may be saved locally on software application 420 or may be saved on a remote server (e.g., server 102) and retrieved by software application 420. Upon being informed that authentication was successful, software application 420 may communicate with the password manager module to obtain certain credentials. Specifically, software application 420 may generate a request for credential information from password manager module and/or transmit the request to password manager module. Upon receiving the request, password manager module may retrieve the requested credential information, either locally or from the remote server, and generate and/or transmit the requested credential information.

Software application 420, upon receiving the credentials, will submit or otherwise transmit the credentials to secure system 410 which will grant access to the user upon validating the credentials. Alternatively, in some circumstances, upon receiving notification that authentication was successful at step 512, interface device 405 may instruct secure system 410 to grant access to the user without the need for credentials. In this manner, the user using mobile device 107 may perform authentication on mobile device 107 to access secure system 410.

As explained above, authentication system 400 may be employed to grant a user access to a physical location. For example, secure system 410 may be a door that grants access to a secure employment facility. The door may remain locked but may be unlocked using authentication system 400.

In this example, an employee may approach the door of the facility and press a physical button located on interface device 405 located on or near the door. Interface device 405 may initiate communication with the employee's mobile phone as set forth above. The employee, having registered his or her mobile phone, may use the mobile phone to gain access to the facility.

As described above with respect to steps 505-507, after pressing the button to initiate communication, the employee will receive a message on the mobile phone requesting the user to enter biometric information for authentication. In this example, mobile device 107 is programmed to automatically send interface device 405 user identification information in the form of the phone number corresponding to the mobile device which is validated by an offsite server.

The employee will next follow prompts on the display of his or her mobile phone. In this example, the company has programmed application 50 to request a thumbprint first and then perform a face scan, resulting in a two-step authentication approach. Following the prompts on his or her phone, the employee will generate authentication data in the form of a thumb print and a face scan and authenticate the data on the employee's mobile phone.

The employee's phone will compare the authentication data to authentication data stored locally on the phone. If it is determine that the authentication is successful, the mobile phone will send a message to interface device 405 informing the interface device that authentication was successful. The interface device may share this message with the offsite server. Interface device will then, via a wired or wireless connection, instruct the door (i.e., secure system 410) to open.

In this manner the employee may gain access to the employment facility using the employee's mobile phone. The offsite server may be informed every time the interface device instructs the secure system to open the door. In this way, the offsite server may keep a log of each user that enters the employment facility and at what time. A similar authentication system may be used to exit the facility (of course allowing for emergency exiting). The system that permits exiting the facility may also be in communication with the same offsite server which may generate a log of each user that exits the employment facility and at what time. Accordingly, a log may be generated for the users that enter and exit the facility. The log could be used to automatically track the time worked for hourly employees.

As also explained above, authentication system 400 may be employed to grant a user access to a computing device such as an ATM and/or to restricted information and/or functionality on a computing device. In this examples, secure system 410 and interface device 405 is the same device and/or interface device 405 is incorporated into and otherwise part of the desktop computer and ATM.

At set forth above with respect to FIG. 6, the user may download the mobile application to the user's mobile phone. The user may register and populate a user profile running the mobile application on the mobile phone. Accordingly, using the mobile device, the user may generate biometric authentication data that is stored on the user's mobile phone. The mobile application will be programmed to store the user identification information, in this case, the user's phone number, name, and bank identification number, on a bank server. To complete registration, the user also inputs ATM login-in credentials to the mobile application which will be saved locally on the mobile phone in an encrypted format. It is assumed that, for the purposes of this example, software application 420 was loaded on to the ATM by the bank administrators.

To access the ATM, the user will approach the ATM with the mobile device. The user will either press a mechanical button on the ATM or a touch screen button on the ATM to initiate communication with the ATM. Alternatively, the ATM may include a proximity sensor and determine that the user's mobile device is nearby. The ATM will send a message to the mobile phone requesting user identification information. Alternatively, the ATM may communicate with the mobile phone through the bank server.

The user will enter the requested user identification information into the mobile phone. The ATM will communicate the user identification information to the bank server for validation. Upon confirming that the user is registered with the bank's authentication system, the ATM and/or bank server will request authentication data from the mobile phone. In this case the requested authentication data involves a thumbprint scan. The user will generate the requested authentication data using the mobile device and the authentication data will be compared to authentication data in the user's profile.

If the authentication is successful (i.e., the obtained authentication data is the same or substantially similar to the authentication data in the user's profile), the mobile device will inform the ATM and/or bank server that the authentication was successful. The ATM and/or bank server will then request that that the mobile device provide ATM credentials which includes the user's ATM pin. The user credentials are stored on the mobile phone as part of the user's profile. The mobile phone will automatically generate an encrypted response with the user's ATM credentials.

The bank server will compare the received ATM credentials to those in the bank's database. If the credentials provided match those saved on the bank's server, the server will send a message to the ATM granting the user access to the user's bank account on the ATM. In this manner the bank customer may gain access to ATM using only the user's mobile device.

A user may employ a similar approach to access a computing device such as a work desktop computer. Like in the ATM example, the user may download the mobile application to the user's mobile phone and register the user profile. However, in this example the credentials will be sign-in credentials for the computing device. The user's profile will be shared with a company server. It is assumed that, for the purposes of this example, software application 420 was loaded on to the work desktop computer by the company administrators.

To access the work computer the user will either press an initiation button on the work computer touch screen or use an input device (keyboard or mouse) to select an initiation button on the display of the work computer. The work computer will proceed to send a request to the mobile phone for user identification information. In this case the mobile phone running mobile application 50 will be programmed to automatically respond to the request with the employee's user identification information. The work computer will communicate the user identification information to the company server for validation. Upon confirming that the user is registered with the company's authentication system, the work computer or company server will request authentication data from the mobile phone. In this case the requested authentication data involves a face scan. The user will generate the requested authentication data using the mobile device and the authentication data will be compared to authentication data in the user's profile.

If the authentication is successful (i.e., the obtained authentication data is the same or substantially similar to the authentication data in the user's profile), the mobile device will inform the work computer and/or company server that the authentication was successful. In response the work computer will grant the user access to the work computer. In this manner the bank customer may gain access to the work computer using only the user's mobile device.

In one example, mobile application 318 and/or mobile application 50 may also include a panic button. If the user presses the panic button for a predetermined time (e.g., 30 seconds), then the mobile application may raise an alarm and/or alert the law enforcement agencies. The panic button may be hidden in a particular area of the user interface. For example, the user may be forced by a thief to authenticate on an online bank account using her mobile phone. In such a situation, the user may press the panic button for the predetermined time to raise alarm and alert the law enforcement agencies.

It should be understood that any of the computer operations described herein above may be implemented at least in part as computer-readable instructions stored on a computer-readable memory. It will of course be understood that the embodiments described herein are illustrative, and components may be arranged, substituted, combined, and designed in a wide variety of different configurations, all of which are contemplated and fall within the scope of this disclosure.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for authenticating a user, the method comprising:
   generating, by a computing device, a request for user identification information;
   transmitting, by the computing device, the request for the user identification information to a mobile device;
   receiving, by the computing device, the user identification information from the mobile device;
   transmitting, by the computing device, the user identification information to a server;
   receiving, by the computing device, a message from the server confirming that the user identification information is valid;
   generating, by the computing device, a request for authentication;
   transmitting, by the computing device, the request for authentication to the mobile device; and
   receiving, by the computing device, a message from the mobile device confirming that authentication was successful;
   generating, by the computing device, a request for credential information from the server;
   transmitting, by the computing device, the request for credential information to the server;
   receiving, by the computing device, credential information from the server; and
   auto-populating, by the computing device, at least a portion of the credential information into the website;
   wherein the website is a streaming services website that plays media content.

2. The method of claim 1, wherein receiving the user identification information involves receiving a phone number corresponding to the mobile device.

3. The method of claim 1, wherein transmitting the request for authentication to the mobile device involves transmitting a request to the mobile device to obtain authentication information using a biometric sensor on the mobile device and compare the authentication information that was obtained to authentication information that is saved locally on the mobile device.

4. The method of claim 3, wherein the authentication information obtained using the biometric sensor and the authentication information saved locally on the mobile device involves one or more of: retina scan information, iris pattern information, finger print scan information, finger vein scan information, face scan information and voice pattern information.

5. The method of claim 1, wherein receiving a message from the mobile device confirming that authentication was successful involves receiving a message that the mobile device compared the authentication information that was obtained to authentication information that is saved locally on the mobile device and determined that the authentication information that was obtained is the same as the authentication information that is saved locally on the mobile device.

6. The method of claim 1, wherein:
   generating a request for credential information comprises generating the request for credential information from a password manager module; and
   receiving credential information comprises receiving the credential information from the password manager module.

7. A non-transient memory medium operatively coupled to at least one processor in a computing device, wherein the non-transient medium is configured to store a plurality of instructions to authenticate a user and cause the at least one processor to:
- generate, by a computing device, a request for user identification information;
- transmit, by the computing device, the request for the user identification information to a mobile device;
- receive, by the computing device, the user identification information from the mobile device;
- transmit, by the computing device, the user identification information to a server;
- receive, by the computing device, a message from the server confirming that the user identification information is valid;
- generate, by the computing device, a request for authentication;
- transmit, by the computing device, the request for authentication to the mobile device; and
- receive, by the computing device, a message from the mobile device confirming that authentication was successful;
- generate, by the computing device, a request for credential information from the server;
- transmit, by the computing device, the request for credential information to the server;
- receive, by the computing device, credential information from the server; and
- auto-populate, by the computing device, at least a portion of the credential information into the website;
- wherein the website is a streaming services website that plays media content.

8. The non-transient memory medium of claim 7, wherein receiving the user identification information involves receiving a phone number corresponding to the mobile device.

9. The non-transient memory medium of claim 7, wherein transmitting the request for authentication to the mobile device involves transmitting a request to the mobile device to obtain authentication information using a biometric sensor on the mobile device and compare the authentication information that was obtained to authentication information that is saved locally on the mobile device.

10. The non-transient memory medium of claim 9, wherein the authentication information obtained using the biometric sensor and the authentication information saved locally on the mobile device involves one or more of: retina scan information, iris pattern information, finger print scan information, finger vein scan information, face scan information and voice pattern information.

11. The non-transient memory medium of claim 7, wherein receiving a message from the mobile device confirming that authentication was successful involves receiving a message that the mobile device compared the authentication information that was obtained to authentication information that is saved locally on the mobile device and determined that the authentication information that was obtained is the same as the authentication information that is saved locally on the mobile device.

12. The non-transient memory medium of claim 7, wherein:
- generating a request for credential information comprises generating the request for credential information from a password manager module; and
- receiving credential information comprises receiving the credential information from the password manager module.

* * * * *